United States Patent
Kojima

(12)
(10) Patent No.: US 6,209,856 B1
(45) Date of Patent: Apr. 3, 2001

(54) GAS-LIQUID PROCESSING APPARATUS

(76) Inventor: Hisao Kojima, 3-53-21, Shioiri-cho, Tsurumi-ku, Yokohama-shi, Kanagawa-ken (JP)

(*) Notice: Subject to any disclaimer, the term of this patent is extended or adjusted under 35 U.S.C. 154(b) by 0 days.

(21) Appl. No.: 09/345,498

(22) Filed: Jul. 1, 1999

Related U.S. Application Data

(62) Division of application No. 08/924,000, filed on Sep. 5, 1997, now Pat. No. 5,945,039.

(30) Foreign Application Priority Data

Sep. 6, 1996 (JP) .................................................. 8-236969

(51) Int. Cl.$^7$ ......................................................... B01F 3/04
(52) U.S. Cl. ..................... 261/36.1; 261/79.2; 261/108; 261/111; 96/314; 96/319; 366/339
(58) Field of Search ......................... 261/29, 36.1, 79.1, 261/79.2, 108, 111; 55/456, 457; 366/339, 341; 96/301, 314, 317, 319

(56) References Cited

U.S. PATENT DOCUMENTS

| | | | | |
|---|---|---|---|---|
| 1,205,563 | * | 11/1916 | Pepper | 261/79.2 |
| 1,917,643 | * | 7/1933 | Goldkamp | 261/79.2 |
| 2,351,864 | * | 6/1944 | Linderman, Jr. | 261/79.2 |
| 2,361,150 | * | 10/1944 | Petroe | 261/79.2 |
| 2,886,297 | * | 5/1959 | Crandall | 261/79.2 |
| 3,662,890 | * | 5/1972 | Grimshaw | 261/29 |
| 4,062,663 | * | 12/1977 | Spevack | 261/79.2 |
| 4,252,654 | | 2/1981 | Leitzke et al. . | |
| 4,400,355 | * | 8/1983 | Donnelly et al. | 261/79.2 |
| 4,695,298 | * | 9/1987 | Dries | 261/79.2 |
| 4,878,925 | | 11/1989 | Kojima . | |
| 5,104,233 | * | 4/1992 | Kojima | 96/301 |
| 5,215,130 | | 6/1993 | Kojima et al. . | |
| 5,458,789 | | 10/1995 | Dickerson et al. . | |
| 5,525,242 | * | 6/1996 | Kerecz | 261/79.2 |
| 5,605,400 | | 2/1997 | Kojima . | |
| 5,873,302 | * | 2/1999 | Segredo | 366/339 |
| 6,001,155 | * | 12/1999 | Pease | 261/29 |

FOREIGN PATENT DOCUMENTS

| | | | | |
|---|---|---|---|---|
| 1193477 | * | 5/1965 | (DE) | 261/79.2 |
| 0 012 658 | | 6/1980 | (EP) . | |
| 0 442 157 | | 8/1991 | (EP) . | |
| 0 678 329 | | 10/1995 | (EP) . | |
| 5-96144 | | 4/1993 | (JP) . | |
| 829124 | * | 5/1981 | (SU) | 261/79.2 |
| 1370285 | * | 1/1988 | (SU) | 261/79.2 |

OTHER PUBLICATIONS

Patent Abstracts of Japan, vol. 9, No. 317 (C–319), Dec. 12, 1985, JP 60 153922, Aug. 13, 1985.
Patent Abstracts of Japan, vol. 16, No. 29 (C–0904), Jan. 24, 1992, JP 03 242222, Oct. 29, 1991.

* cited by examiner

*Primary Examiner*—C. Scott Bushey
(74) *Attorney, Agent, or Firm*—Oblon, Spivak, McClelland, Maier & Neustadt, P.C.

(57) ABSTRACT

The present invention is to provide a gas-liquid processing apparatus having a high contact efficiency of a gas and a liquid and a high reaction efficiency at a low production cost. A static type fluid mixer includes a passage pipe for the passage of a fluid and a spiral blade body arranged in the passage pipe with the longitudinal direction substantially perpendicularly but being absent in the center portion of the passage pipe. A liquid and a gas are supplied into the static type fluid mixer and a fluid is returned from the bottom portion of the static type fluid mixer to the upper portion via the pipe for the fluid circulation. The fluid is maintained in the static type fluid mixer at a pressured state higher than the atmospheric pressure.

6 Claims, 8 Drawing Sheets

GAS-LIQUID PROCESSING APPARATUS

This application is a Division of application Ser. No. 08/924,000 Filed on Sep. 5, 1997, now U.S. Pat. No. 5,945,039.

BACKGROUND OF THE INVENTION

1. Field of the Invention

The present invention relates to a gas-liquid processing apparatus using a static fluid mixer (motionless fluid mixer) applicable for the substance transfer from a gas to a liquid, such as the gas absorption and the gas dissolution, the substance transfer from a liquid to a gas, such as the diffusion, the gas phase reaction with a substance to be processed in a liquid, such as the aeration and the incubation, the chemical reaction with a gas and a liquid, such as halogenation, hydrogenation, oxidation and sulfidization, and the three phase reaction of gas-liquid-solid, such as a bioreactor and a bioreacting apparatus.

2. Description of the Related Art

In the food industry, carbon dioxide is absorbed in water in the production process of refreshing beverages such as a carbonated water. In the petrochemical industry, a liquid and a gas are contacted in an oxidization reaction apparatus, a hydrogenation reaction apparatus, or a gas diluted water manufacturing apparatus. In the paper and pulp industry, a liquid and a sulfidized water are contacted for the absorption reaction of a sulfidized water. A contact process of a gas and a liquid is necessary also for environmental apparatus such as a deep aeration apparatus, a chlorine pasteurization apparatus of water, an exhaust gas processing apparatus, a purification apparatus for industrial waste water, water supply or sewage, a processing apparatus of industrial waste water with ozone gas, water supply or sewage, and an aerator. Furthermore, in the fishery industry, air is mixed in water by contacting air with water for charging oxygen in a pisciculture pond.

The gas-liquid processing apparatus is used particularly in a purifying apparatus for eliminating an organo-chloric compound such as 1-1-1-trichloroethane, trichloroethylene, and tetrachloroethylene from a waste liquid, a hazardous substance eliminating apparatus for eliminating a substance such as chlorine, trihalomethane and fumic acid from tap water or well water, a pasteurization apparatus for sterilization or pasteurization of dissolution and enrichment of oxygen gas, ozone, chlorine dioxide or chlorine gas in raw water, and a bioreactor where aerobic bacteria are used.

A conventional gas-liquid processing apparatus (a gas-liquid contacting apparatus) utilizing a static type fluid mixer, comprising a spiral blade body in a passage pipe and a plurality of fluid passage for passing a fluid in the pipe axis direction, arranged perpendicularly, for supplying liquid from a position higher than the fluid mixer by the hydrostatic pressure difference, and further, a gas can pass in the fluid mixer (Japanese Patent Application Laid Open No. 5-96144) is known.

However, since the liquid is supplied from the upper direction with respect to the liquid mixer by the hydrostatic pressure difference into the fluid mixer in the conventional gas-liquid processing apparatus, although the production cost and the running cost can be low for not requiring a motive power, it has the disadvantage of having a low gas-liquid contacting efficiency.

SUMMARY OF THE INVENTION

It is an object of the present invention to provide a gas-liquid processing apparatus with a high contacting efficiency between a gas and a liquid and a high reaction rate and a high mixing efficiency at a low production cost.

A first aspect of a gas-liquid processing apparatus according to the present invention comprises one or a plurality of static type fluid mixer arranged substantially perpendicularly in the longitudinal direction, a liquid supplying means for supplying a liquid in the passage pipe, and a gas supplying means for supplying a gas in the passage pipe, wherein a fluid consisted of said liquid and said gas is in the pressured state higher than the atmospheric pressure in the static type fluid mixer.

A second aspect of a gas-liquid processing apparatus of the present invention comprises a plurality of static type fluid mixers arranged parallel to each other and substantially perpendicularly in the longitudinal direction, a container for keeping a fluid and arranging the static type fluid mixers so as to be soaked at least partially in the fluid, partition members for partitioning the inside of the container for each of the static type fluid mixers so as to allow passage of a liquid but not allow passage of a gas, and pipes for connecting the gas space of each room of the container partitioned by the partition members and a gas introducing portion of an adjacent static type fluid mixer, wherein the fluid is in the pressured state higher than the atmospheric pressure in the static type fluid mixers.

Furthermore, it is preferable that a circulating means for returning the fluid from the bottom portion of the static type fluid mixer to the upper portion thereof for circulating the fluid is further provided in the first and second aspects of the present invention.

It is also preferable that the static type fluid mixer comprises a passage pipe for the passage of a fluid and a spiral blade body arranged in the passage pipe. An opening is formed in the spiral blade body at the center portion of the passage pipe.

In the first aspect of the present invention, a liquid and a gas are mixed and contacted for generating a certain reaction, a gas absorption or a dissolution while passing through the fluid mixer. In this case, the fluid is maintained in a pressured state in the static type fluid mixer. Preferably, the liquid and the gas are circulated and supplied in the static type fluid mixer. Accordingly, in the present invention, a fluid is maintained in a pressurized state higher than the atmospheric pressure, and preferably circulated and supplied into the static type fluid mixer. Therefore, a gas and liquid are contacted and mixed with a high efficiency. Moreover, since no motive power is used for stirring the gas and the liquid, it has the advantage of having a low production cost.

In the second aspect of the present invention, a plurality of the static type fluid mixers are arranged parallel to each other and the container is partitioned by the partition members so that a liquid can move freely among the rooms but a gas cannot move freely. Then the gas is introduced to the gas introducing portion of an adjacent static type fluid mixer by the pipe. Then, the gas passes through the static type fluid mixer of each room successively and contacts with the liquid. Accordingly, the gas and the liquid are introduced into the static type fluid mixer arranged at an end of the container so that a mixed fluid in the container is discharged from the room on the other end of the container. Similarly, a fluid is mixed in a pressured state in the static type fluid mixer as well as since the contacting length of a gas and a liquid is long in the second aspect, the contacting efficiency of the liquid and the gas is extremely high. By circulating and supplying a fluid in the static type fluid mixer in each room, the contacting efficiency of a liquid and a gas can be further higher.

DESCRIPTION OF THE PREFERRED EMBODIMENTS

Figure 1:
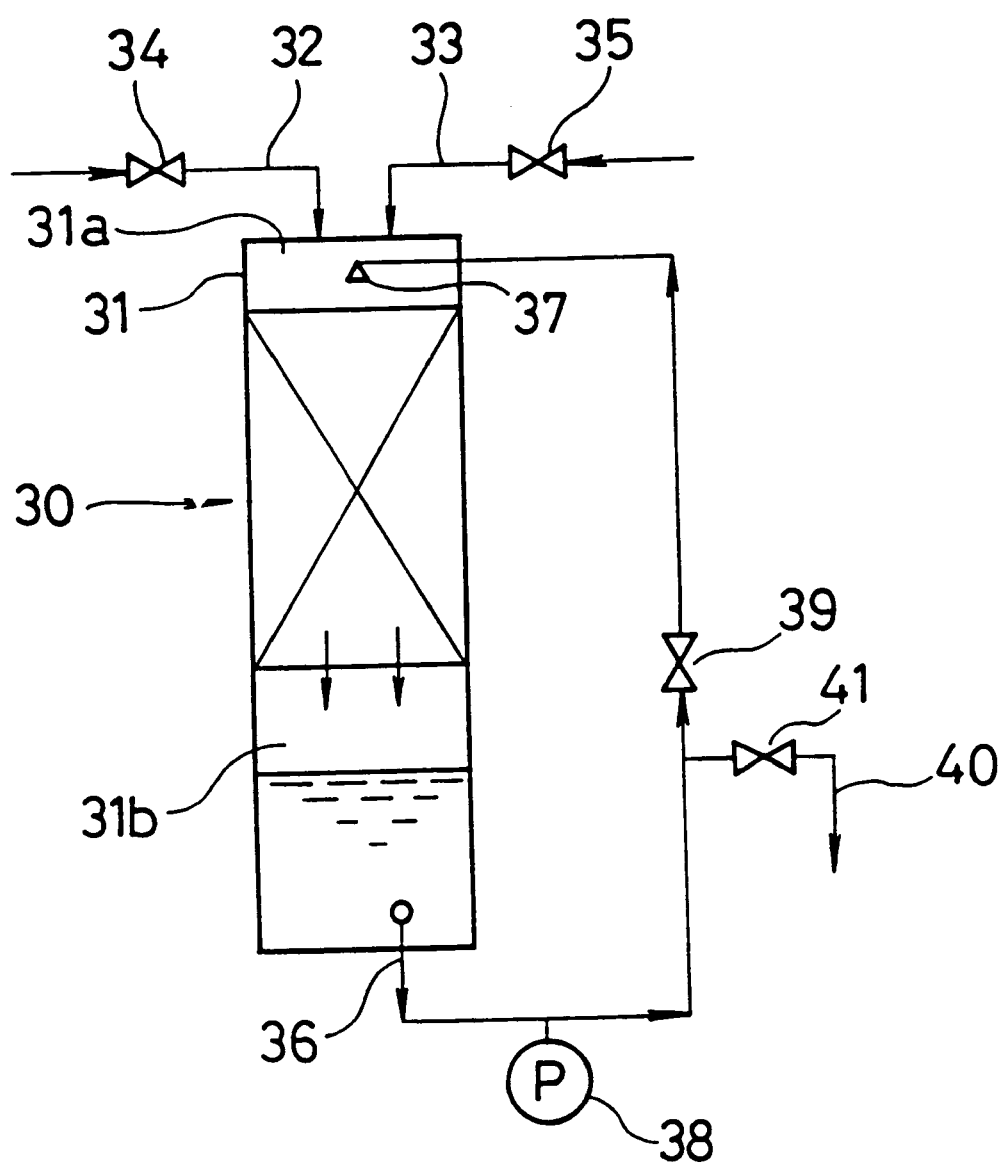
FIG. 1 is a schematic diagram of a first embodiment of the present invention.
Figure 2:
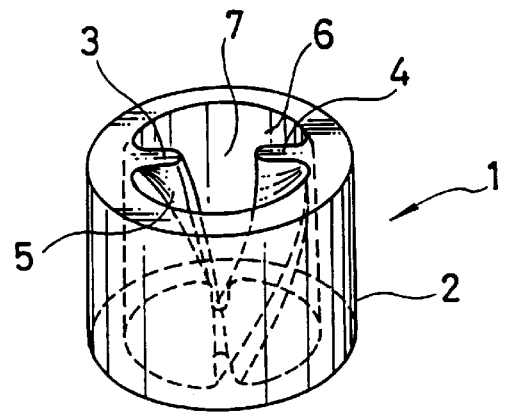
FIG. 2 is a perspective view of a 90° rotation type mixing element.
Figure 3:
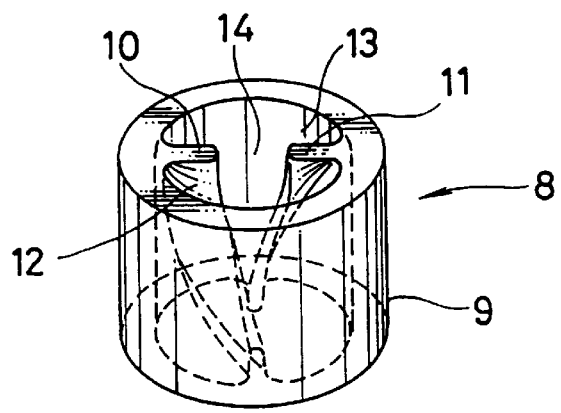
FIG. 3 is a perspective view of a 90° rotation type mixing element.
Figure 4:
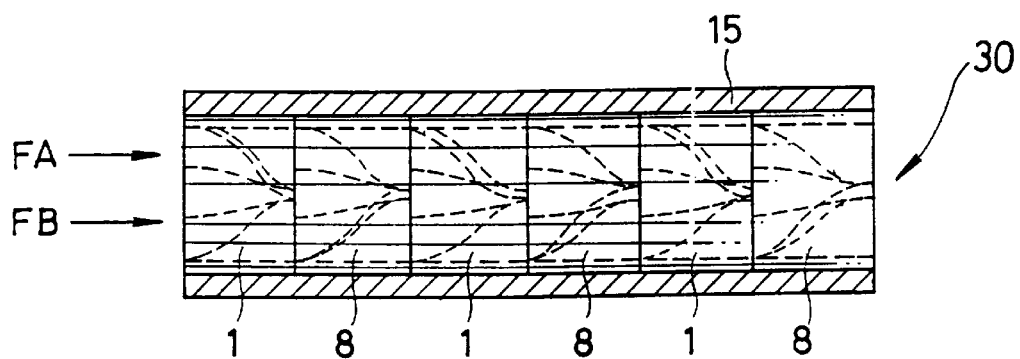
FIG. 4 is a side view of a static type fluid mixer utilizing the mixing element.

Hereinafter embodiments of the present invention will be explained concretely with reference to the accompanied drawings. FIG. 1 is a schematic diagram of the first embodiment of the present invention. FIGS. 2 and 3 are perspective views of a mixing element. FIG. 4 is a side view of a static type fluid mixer utilizing the mixing element. As shown in FIGS. 2 to 4, each of mixing elements 1 and 8 of a static type fluid mixer 30 used in this embodiment comprises a cylindrical passage pipe 2 or 9, and spiral blade bodies 3, 4 or 10, 11 arranged in the passage pipe 2 or 9. The blade bodies 3, 4 and 10, 11 are twisted clockwise (i.e. a right-handed rotation) or counterclockwise (i.e. a left-handed rotation) by 90°, respectively so as to form fluid passages 5, 6 or 12, 13. The blade bodies 3, 4, or 10, 11 do not exist on the axis of the passage pipe 2 or 9. Accordingly, an opening portion 7 or 14 is formed on the axis of the passage pipe 2, 9 when viewed two-dimensionally. Therefore, the fluid passages 5, 6 and the fluid passages 12, 13 communicate with each other via the opening portions 7 and 14 through the entire length of the passage pipes 2 and 9.

The static type fluid mixer 30 can be assembled by fitting the mixing elements 1 and 8 in a cylindrical casing 15 alternately so as to have the edges of the blade bodies 3, 4 and 10, 11 of the mixing elements 1 and 8 orthogonal to each other.

While two kinds of fluids FA, FB pass through the fluid passages of the static type fluid mixer 30 of the above-mentioned configuration, part of the fluid rotates spirally by 90° to be partially sheared at the opening portion, joins the fluid passed through the other fluid passage and is further divided, and rotates spirally by 90° to the other direction. While repeating the rotation, shearing, confluence, and division as mentioned above, the fluids can be mixed. In the static type fluid mixer 30, 180° rotation type blade bodies can be used in place of the 90° rotation type blade bodies of this embodiment.

In this embodiment, the static type fluid mixer 30 of the above-mentioned configuration is placed vertically with respect to its longitudinal direction in a sealed processing container 31, as shown in FIG. 1. In this case, an introducing portion 31a is provided at the upper part of the container 31 as a space for introducing a gas and a liquid, and a storage portion 31b is provided at the lower part of the container 31 for storing a liquid.

A pipe 32, connected with a liquid supply, is connected with the introducing portion 31a at the upper part of the container 31. A flow regulating valve 34 is provided in the pipe 32. A pipe 33 connected with a gas supply is connected with the introducing portion 31a. A flow regulating valve 35 is provided in the pipe 33. A liquid and a gas is supplied into the container 31 with pressure from the liquid supply and the gas supply. A spray nozzle 37 is provided in the introducing portion 31a at the upper part of the container 31 for jetting the liquid.

On the other hand, a pipe 36 is connected with the storage portion 31b at the lower part of the container 31 for discharging the liquid stored at the lower part of the container to outside the container via the pipe 36. The pipe 36 is connected with the spray nozzle 37 at the upper part of the container so that the liquid discharged from the bottom portion of the container is supplied to the spray nozzle 37 at the upper part of the container via the pipe 36 to be jetted toward the inside of the container 31 via the nozzle 37. Accordingly, the liquid in the container 31 is returned into the container 31 via the pipe 36 to be circulated and supplied to the static type fluid mixer 30 in the container 31. A pump 38 is provided in the pipe 36, and furthermore, a flow regulating valve 39 is provided therein. A pipe 40 branches out from the pipe 36 at the upstream side thereof with respect to the flow regulating valve 39. A switching valve 41 is provided in the pipe 40.

Operation of the gas-liquid processing apparatus of the above-mentioned configuration will now be explained. With the valve 41 closed, and the valve 39 opened, the valves 34 and 35 are opened at a predetermined angle for supplying the liquid and the gas into the container 31 via the pipes 32 and 33 at a predetermined rate with pressure. Then the liquid and the gas are stirred and mixed in the static type fluid mixer 30 so that the gas is dissolved in the liquid to be aerated or reacted by sufficiently contacting the gas and the liquid.

The mixture fluid stored in the container 31 is supplied to the spray nozzle 37 at the upper part of the container 31 by the pump 38 to be jetted into the container 31 by the spray nozzle 37. Then a liquid and a gas supplied from the pipes 32 and 33, and the mixture fluid from the spray nozzle 37 are mixed while passing through the static type fluid mixer 30. After applying pressure to the gas and the liquid in the container 31 until the pressure becomes higher than atmospheric pressure, the valves 34 and 35 are closed to seal the mixture fluid of the liquid and the gas in the container 31. The fluid passing through the static type fluid mixer 30 in the container 31 circulates in the static type fluid mixer 30 in a pressured state. Accordingly, the liquid and the gas sufficiently contacts so that the gas is dissolved in the liquid, aerated or reacted.

Afterwards, the fluid after the mixing and contacting processing is discharged from the container 31 via the pipe 40 by closing the valve 39 and opening the valve 41.

Figure 5:
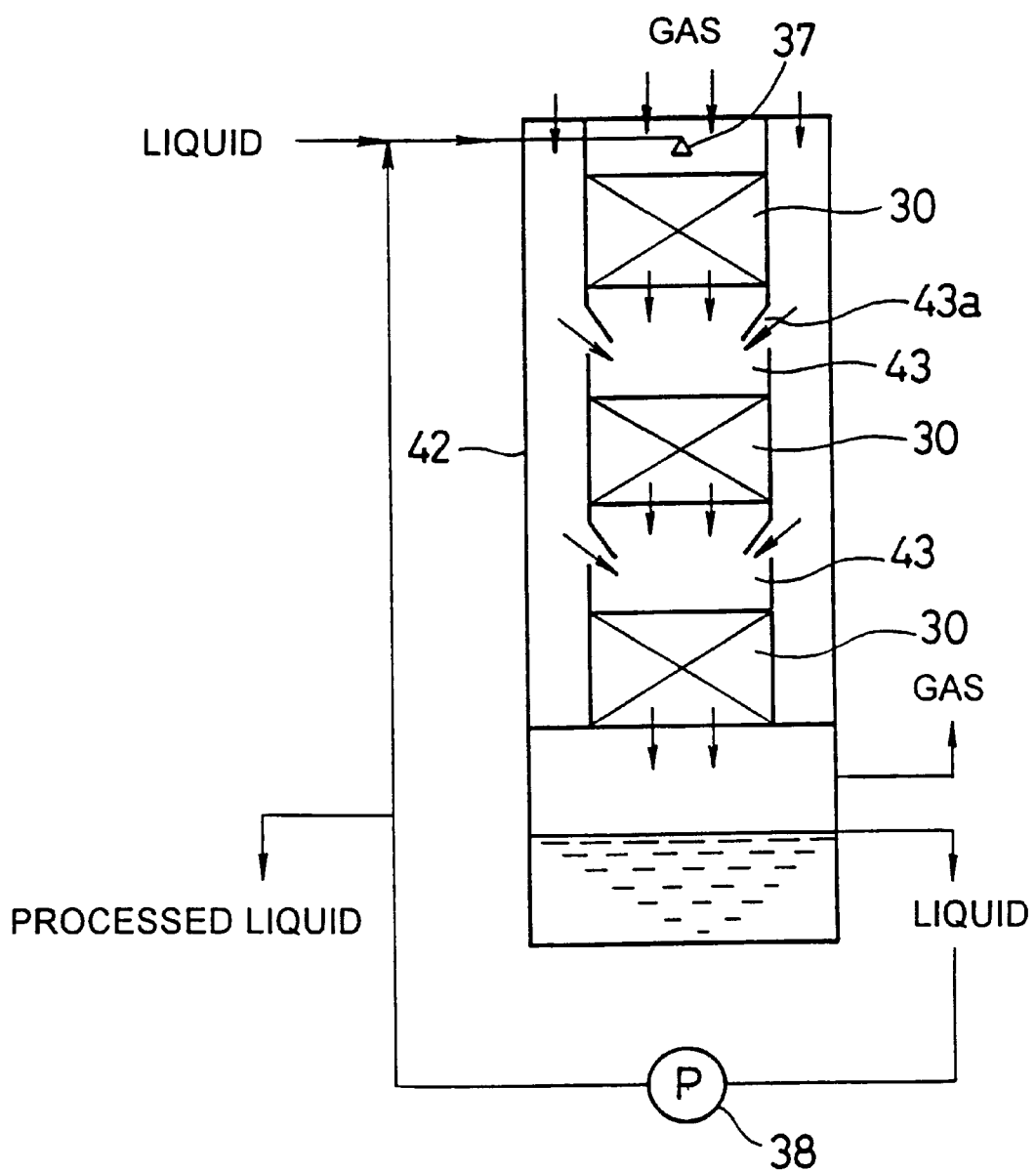
FIG. 5 is a schematic diagram of a second embodiment of the present invention.

FIG. 5 is a schematic diagram of the second embodiment of the present invention. In a container 42, a plurality of the static type fluid mixers 30 are interlocked via cylindrical spacers 43 having the same diameter size as the casing of the static type fluid mixers. A gap is formed between the container and the static type fluid mixers 30 or the spacers 43 for the passage of a fluid. That is, the container 42, the static type fluid mixers 30 and the spacers 43 have a double-pipe structure. The spacers 43 are provided with holes 43a for the passage of a fluid so that a fluid can flow into the spacers 43 from the gap via the holes 43a. A mixture fluid of the gas and the liquid is stored at the bottom portion of the container 42 and the mixture fluid is returned to the spray nozzle 37 at the upper part of the container via the pump 38.

In the gas-liquid processing apparatus of the above-mentioned configuration, a liquid is jetted from the spray nozzle 37 into the uppermost static type fluid mixer 30 to be mixed with a gas introduced from the top of the container to the inside of the container, contacted, and processed. The mixture fluid is also mixed with a gas introduced via the holes 43a at the spacers 43 to be introduced further into the lower static type fluid mixer 30.

In this embodiment, the contacting processing of a gas and a liquid is conducted in a pressured state higher than the atmospheric pressure, and thus the contacting efficiency is extremely high. Further, since a fluid is circulated and supplied in the static type fluid mixers 30, the dissolution of the gas or the reaction between the gas and the liquid can sufficiently proceed.

Figure 6:
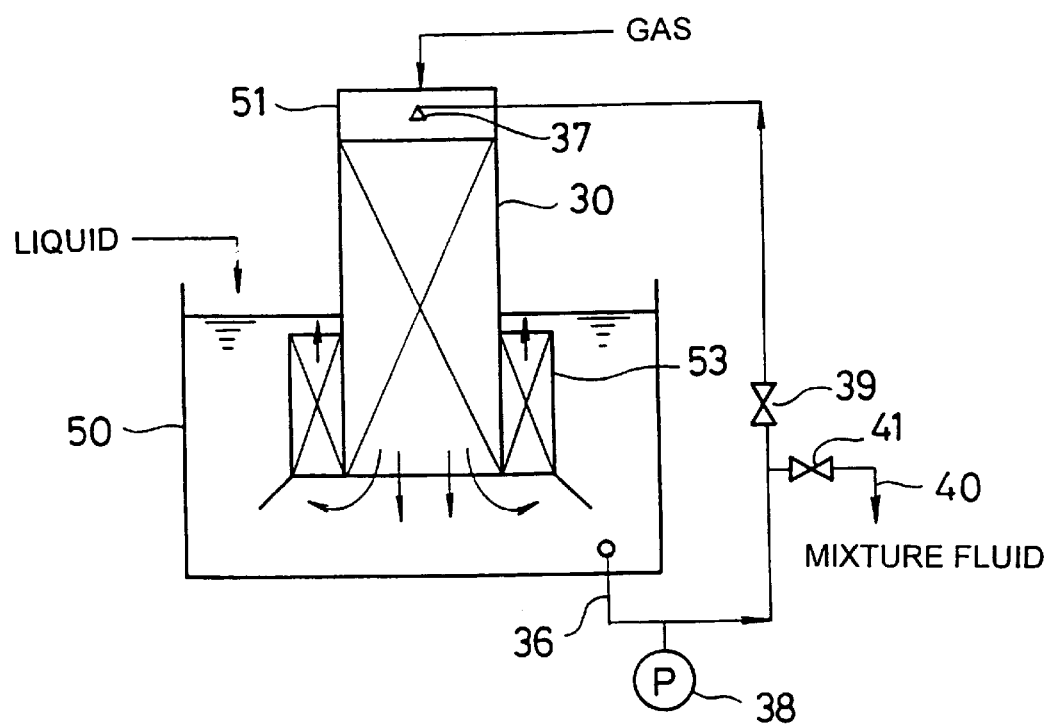
FIG. 6 is a schematic diagram of a third embodiment of the present invention.

FIG. 6 is a schematic diagram of the third embodiment of the present invention. A liquid is supplied in a container 50 to be stored. The static type fluid mixer 30 is arranged with the lower half thereof soaked in the liquid in the container 50 with the fluid passing direction vertically. An introducing portion 51 is provided at the upper part of the static type fluid mixer 30 for introducing a gas into the static type fluid mixer 30, and the spray nozzle 37 is provided in the introducing portion 51 for circulating and supplying a liquid. The outer periphery of the static type fluid mixer 50 of the portion soaked in the fluid in the container 50 is fitted with spiral blade bodies so that the static type fluid mixer 53 is formed by the spiral blade bodies.

In the gas-liquid processing apparatus of the above-mentioned configuration, a liquid is supplied in the container 50, and the liquid is pumped up into the introducing portion 51 by the pump 38. The liquid is jetted inside the introducing portion 51 via the spray nozzle 37 so as to be supplied with pressure into the static type fluid mixer 30 with the air supplied to the introducing portion 51. The liquid and the gas are mixed while passing through the static type fluid mixer 30 downward. The mixture fluid enters the container 50 from the lower end of the static type fluid mixer 30 and is further mixed while passing through the static type fluid mixer 53 in the rising process. In this embodiment, since the pressure supplied to the introducing portion 51 of the gas is adjusted so that the surface of the fluid in the container 50 is always above the lower end of the static type fluid mixer 30, the fluid is applied with a pressure higher than the atmospheric pressure at a position lower than the fluid surface in the static type fluid mixer 30. Accordingly, a fluid is mixed with a high efficiency in this embodiment.

Figure 7:
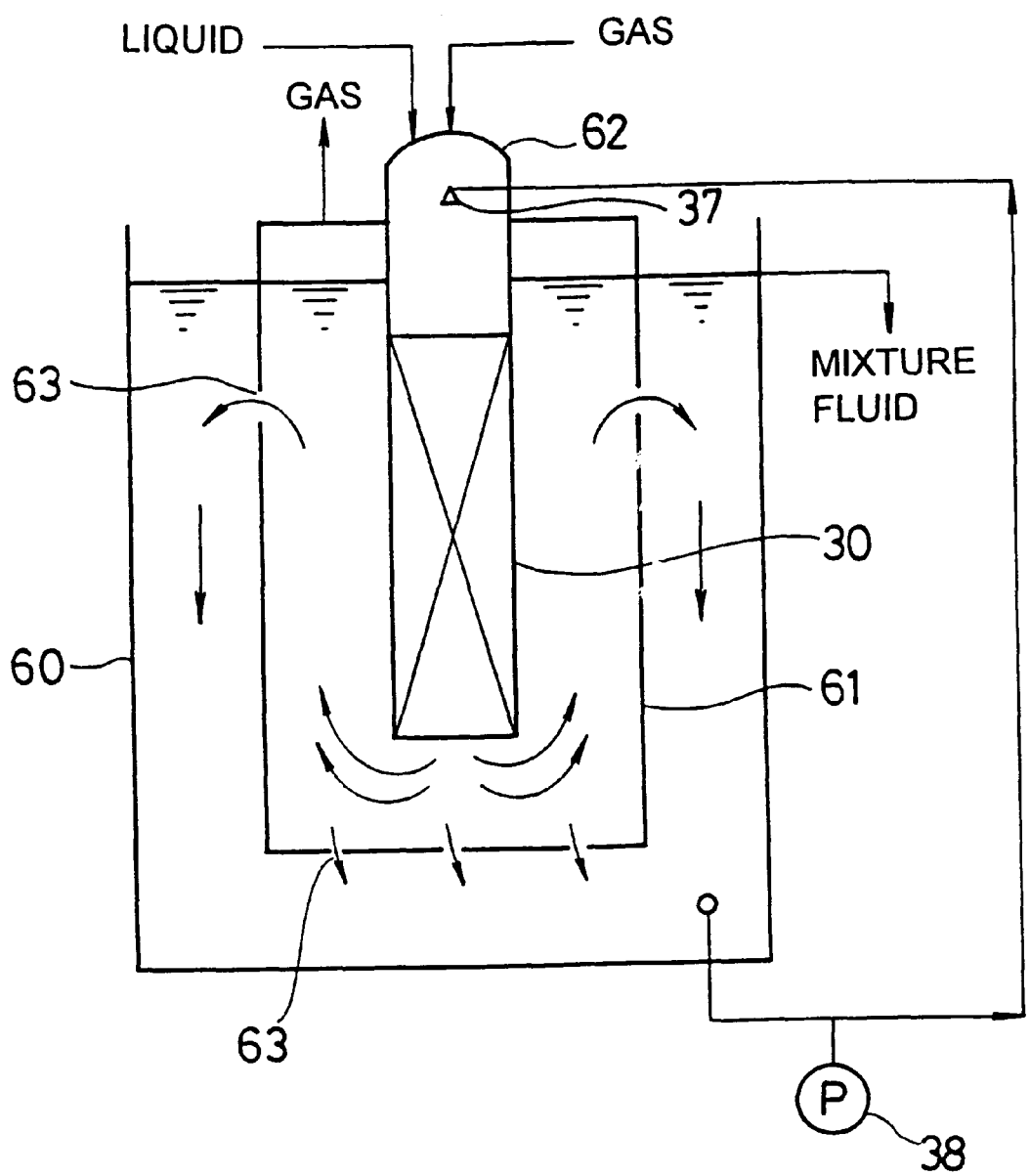
FIG. 7 is a schematic diagram of a fourth embodiment of the present invention.

FIG. 7 is a schematic diagram of the fourth embodiment of the present invention. The static type fluid mixer 30 is arranged in a container 60. An introducing portion 62 is provided at the upper part of the static type fluid mixer 30. The lower part of the introducing portion 62 and the static type fluid mixer 30 are surrounded by a container 61. The container 61 is arranged in the container 60 between the container 60 and the static type fluid mixer 30. A plurality of the holes 63 are provided in the container 61 so that the fluid in the container 61 is discharged to the outside via the holes 63. On the other hand, the supply pressure of a liquid and a gas is selected so that the fluid surface in the container 60 is always above the static type fluid mixer 30.

In the gas-liquid processing apparatus of the above-mentioned configuration, a liquid and a fluid are always supplied to the introducing portion 62, mixed by the static type fluid mixer 30 and discharged into the container 61. Furthermore, the fluid is discharged into the container 60 via the holes 63, and again supplied into the introducing portion 62 from the spray nozzle 37 at the upper part of the static type fluid mixer 30 by the pump 38. Accordingly, the fluid is circulated and supplied to the static type fluid mixer 30. Since the static type fluid mixer 30 is below the fluid surface in the containers 60, 61, the fluid in the static type fluid mixer 30 is applied with the pressure based on the hydrostatic pressure difference. Therefore, the gas and liquid contacting efficiency of a fluid is high.

Figure 8:
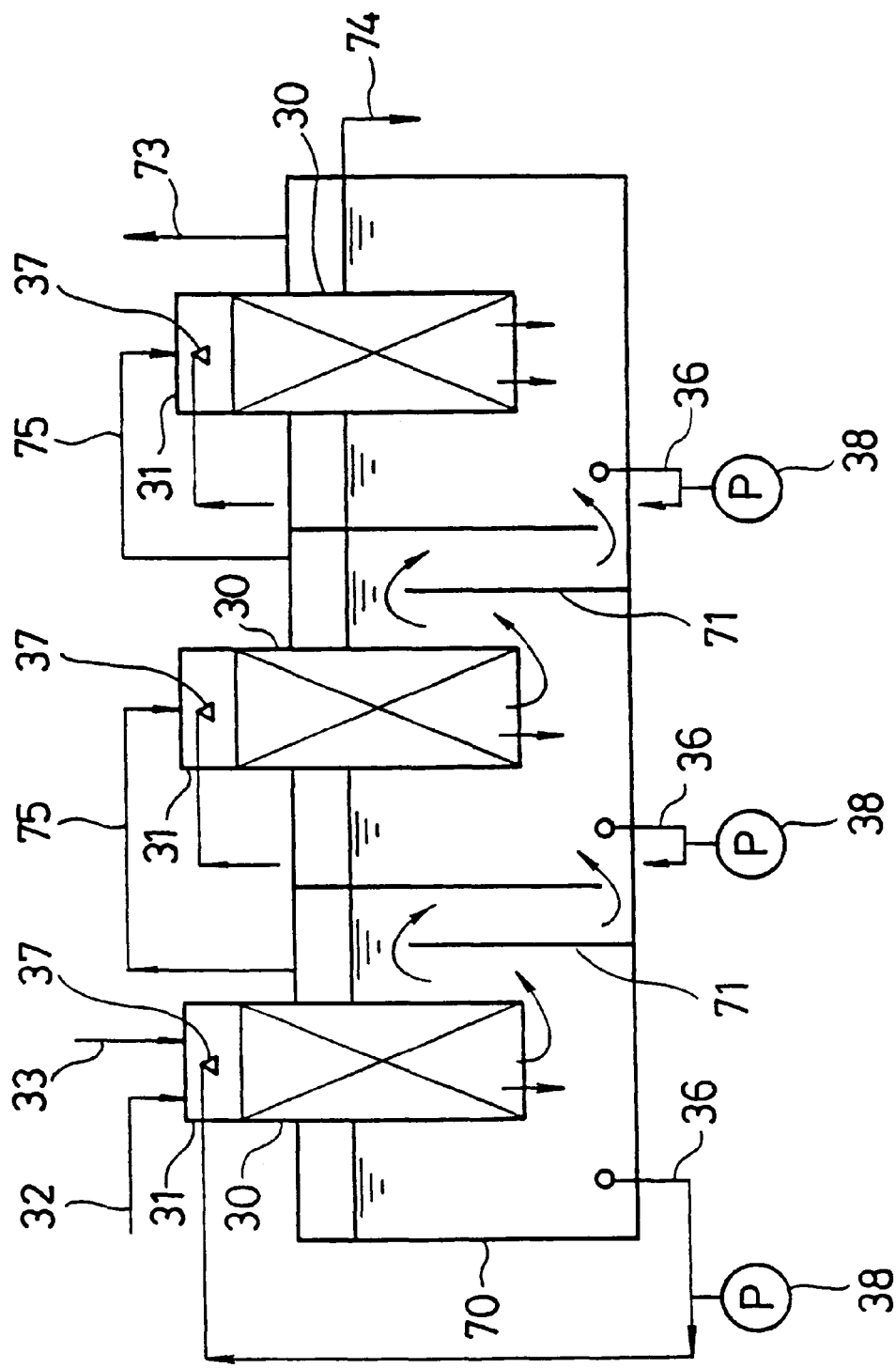
FIG. 8 is a schematic diagram of a fifth embodiment of the present invention.

FIG. 8 is a schematic diagram of the fifth embodiment of the present invention. The fifth embodiment is another embodiment of the second embodiment, wherein a plurality of the gas-liquid processing apparatus of the first embodiment shown in FIG. 1 are provided parallel. Three static type fluid mixers 30 are arranged in the sealed container 70 with the lower part inserted. A fluid is stored in the container 70. Partitioning members 71 comprising partition plates, standing from the bottom plate of the container to a position lower than the fluid surface, and partition plates, hanged from the upper plate of the container to deeper than the fluid surface, are arranged between the static type fluid mixers. An introducing portion 31 of a gas is provided at the upper part of the static type fluid mixer 30. A pipe 32 for introducing a liquid into the introducing portion 31 and a pipe 33 for introducing a gas into the introducing portion 31 from the outside are connected with the introducing portion 31 of the static type fluid mixer 30 arranged at one end of the container 70. A discharging pipe 73 for discharging a gas and a discharging pipe 74 for discharging a liquid are connected to the room having the static type fluid mixer 30 on the opposite end of the container 70. In each room partitioned by the partitioning members 71, a fluid is supplied to the spray nozzle 37 provided at the introducing portion 31 of the static type fluid mixer 30 of each room by the pump 38 via the pipe 36 so as to be circulated and supplied into the static type fluid mixer 30.

In the gas-liquid processing apparatus of the above-mentioned configuration, a liquid and a gas are introduced into the introducing portion 31 of the static type fluid mixer 30 on the left end of the drawing via the pipes 32, 33. The liquid and the gas are mixed in the static type fluid mixer 30 and discharged into the container 70. The pressure of the liquid and the gas introduced via the pipes 32, 33 is determined so that the fluid surface in the container 70 is positioned at a comparatively high position in the container 70 as shown in the drawing for the static type fluid mixer 30 sufficiently soaked in the fluid.

In the container 70, a liquid flows to an adjacent room beyond the partitioning members 71, but a gas in each room is supplied from the upper space of the room to the introducing portion 31 of the static type fluid mixer 30 of an adjacent room via a pipe 75. In each room, a liquid is circulated and supplied to the static type fluid mixer 30 via a pipe 36 by the pump 38.

The gas processed by sufficiently contacting with the liquid is discharged from the container 70 via the pipe 73, and the liquid is discharged via the pipe 74. In this embodiment, a liquid and a gas are mixed and contacted in each static type fluid mixer, and a gas moves into the static type fluid mixers successively so as to contact with the liquid in each room. Accordingly, the contacting efficiency between a gas and a liquid is extremely high.

Figure 9:
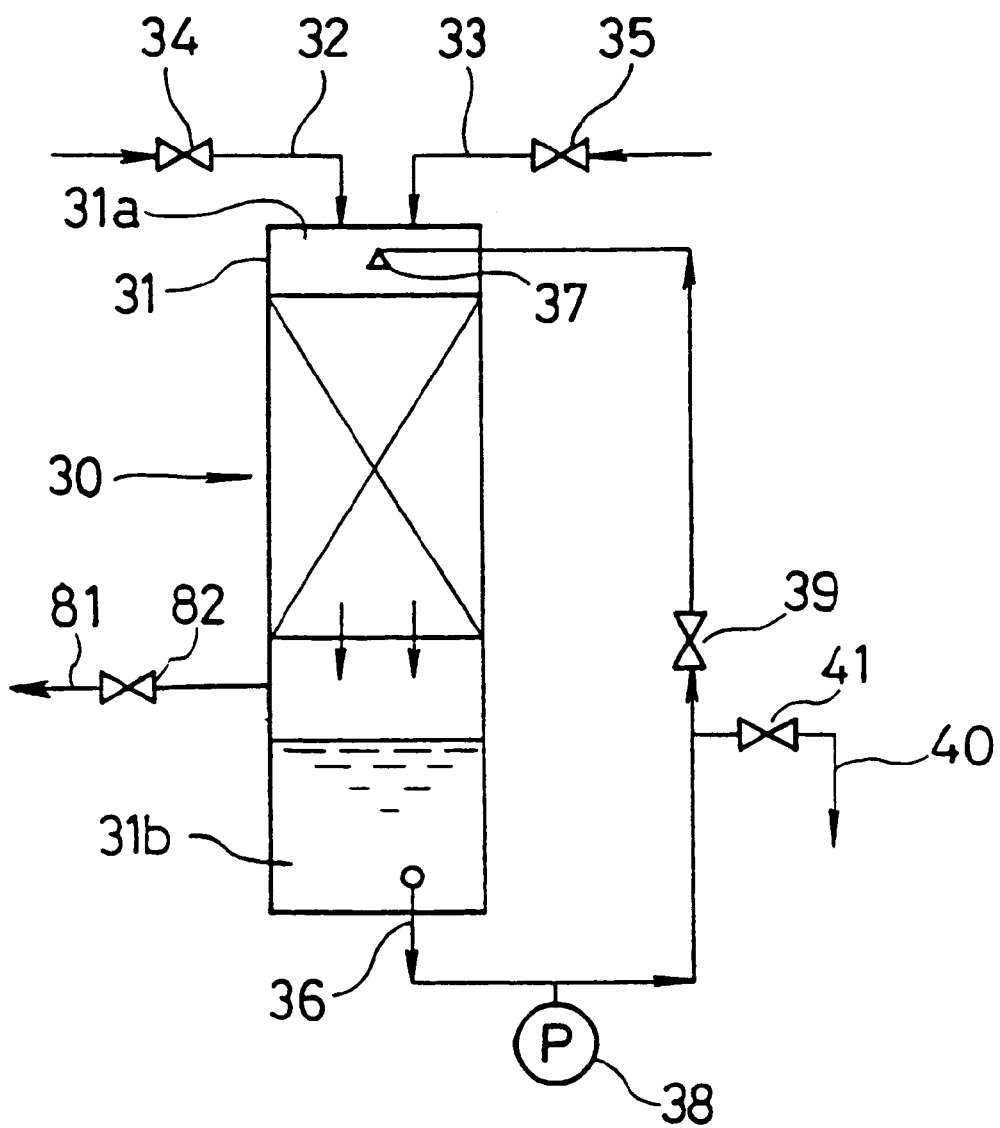
FIG. 9 is a schematic diagram of a sixth embodiment of the present invention.

FIG. 9 is a schematic diagram of the sixth embodiment of the present invention. In the sixth embodiment, a pipe 81 for discharging the gas in the storage portion 31b is connected to the storage portion 31b of the container 31. Also, a valve 82 is provided in the pipe 81. The remaining construction is same as the first embodiment shown in FIG. 1.

Operation of the gas-liquid processing apparatus of the above-mentioned configuration will be explained. With the valve 41 closed, and the valves 39 and 82 opened, the valves 34 and 35 are opened at a predetermined angle for supplying the liquid and the gas into the container 31 via the pipes 32 and 33 at a predetermined rate with pressure. Then the liquid and the gas are stirred and mixed in the static type fluid mixer 30 so that the gas is dissolved in the liquid to be aerated or reacted by sufficiently contacting the gas and the liquid.

The mixture fluid stored in the lower part of the container 31 is supplied to the spray nozzle 37 at the upper part of the container 31 by the pump 38 to be jetted into the container 31 by the spray nozzle 37. Then a liquid and a gas supplied from the pipes 32 and 33, and the mixture fluid from the spray nozzle 37 are mixed while passing through the static type fluid mixer 30. After closing the valves 34 and 82 and applying pressure to the gas and the liquid in the container 31 until the pressure becomes higher than the atmospheric pressure thorough the pipe 33, the valve 35 is closed to seal the mixture fluid of the liquid and the gas in the container 31. The fluid passing through the static type fluid mixer 30 in the container 31 circulates in the static type fluid mixer 30 in a pressurized state. Accordingly, the liquid and the gas sufficiently one another so that the gas is dissolved in the liquid, aerated or reacted.

Afterwards, the fluid after the mixing and contacting processing is discharged from the container 31 via the pipe 40 by closing the valve 39 and opening the valve 41.

Figure 10:
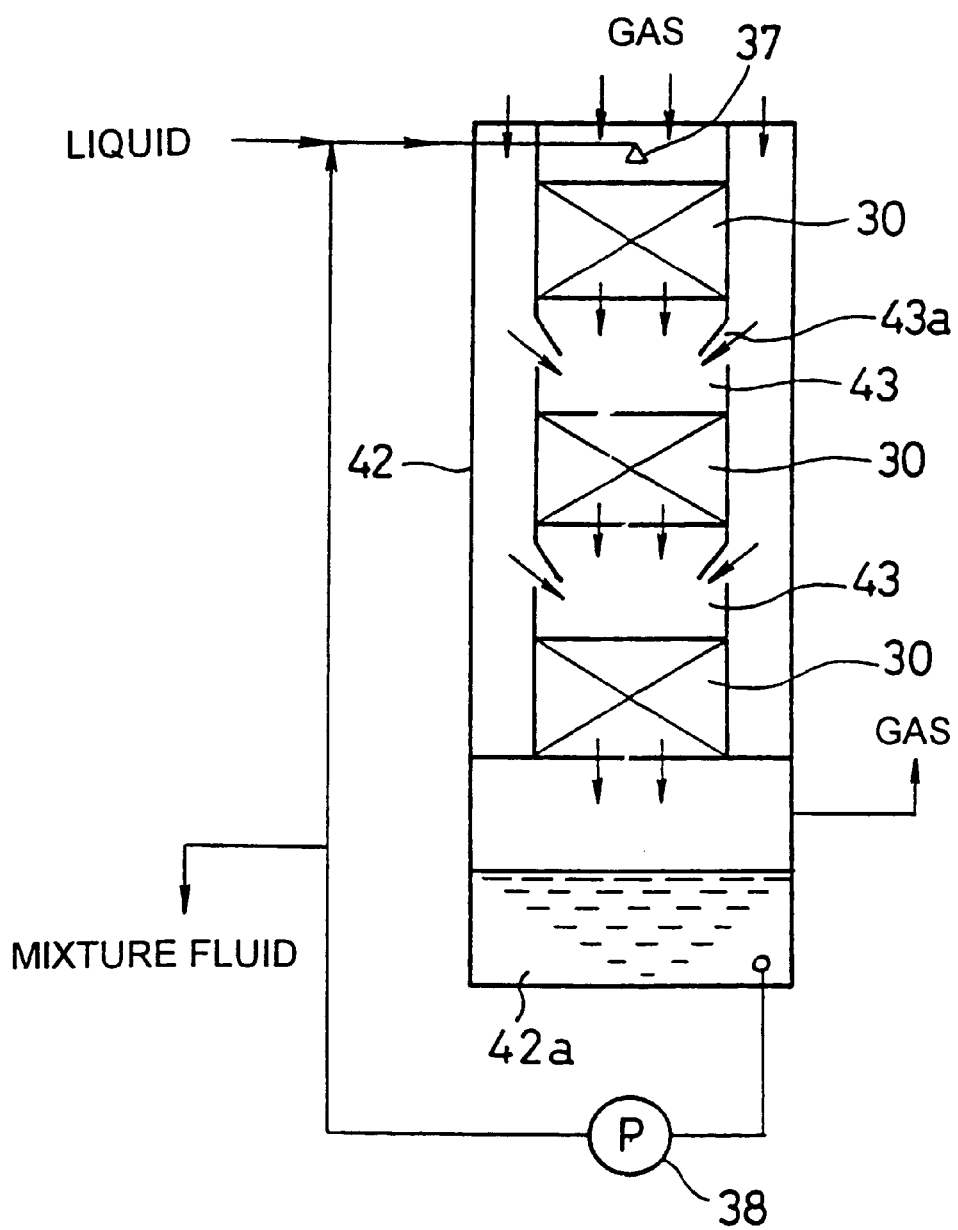
FIG. 10 is a schematic diagram of a seventh embodiment of the present invention.

FIG. 10 is a schematic diagram of the seventh embodiment of the present invention. In the seventh embodiment, a mixture fluid of the gas and the liquid is extracted from the container 42 at the bottom 42a thereof. Other constructional features of the seventh embodiment are same as that of the second embodiment shown in FIG. 5.

The first embodiment shown in FIGS. 1 to 4, the second embodiment shown in FIG. 5, the sixth embodiment shown in FIG. 9 and the seventh embodiment shown in FIG. 10 are effective as an apparatus for eliminating a nitrogen compound in an aqueous solution. They are effective also as an apparatus for eliminating an ammonium type nitrogen in the water supply or sewage, and an apparatus for diffusing a volatile matter in waste water. Furthermore, they are advantageous also as an apparatus for injecting and adding a chlorine gas or an apparatus for dissolving an oxygen gas.

The third embodiment shown in FIG. 6 and the fourth embodiment shown in FIG. 7 can be applied as an apparatus for processing water supply, sewage, or industrial waste water with ozone. Furthermore, the fifth embodiment shown in FIG. 8 is advantageous as a continuous type aeration apparatus or a waste water processing apparatus by the activated sludge method. Furthermore, it is advantageous also as a water processing apparatus with an ozone gas or a waste water processing apparatus by the activated sludge method.

As heretofore mentioned, according to the present invention, since a liquid and a gas are mixed in a pressured state in a static type fluid mixer, it is advantageous in that the contacting efficiency is high as well as the production cost is low.

What is claimed is:

1. A gas-liquid processing apparatus comprising:
   a plurality of static fluid mixers arranged parallel to each other and in a vertical position;
   a container for keeping a fluid and arranging said static fluid mixers so as to be soaked at least partially in said fluid;
   partition members for partitioning the inside of said container for each of the static fluid mixers so as to allow passage of a liquid but not allow passage of a gas; and
   a plurality of pipes for respectively connecting a gas space of rooms of said container partitioned by said partition members and a gas introducing portion of an adjacent static fluid mixer until a last room where said gas space is connected to a gas outlet via a line, wherein said fluid is in pressured state higher than the atmospheric pressure in said static fluid mixers.

2. The gas-liquid processing apparatus according to claim 1, further comprising a circulating means for returning the fluid to an upper portion of the static fluid mixer in each of said rooms for circulating the fluid.

3. The gas-liquid processing apparatus according to claim 1, wherein said static fluid mixer comprises a passage pipe for the passage of a fluid and a spiral blade body in the passage pipe, an opening being formed in said spiral blade body at the center portion of the passage pipe.

4. The gas-liquid processing apparatus according to claim 2, wherein said static fluid mixer comprises a passage pipe for the passage of a fluid and a spiral blade body in the passage pipe, an opening being formed in said spiral blade body at the center portion of the passage pipe.

5. The gas-liquid processing apparatus according to claim 1, further comprising a circulating mechanism for returning the fluid to an upper portion of the static fluid mixer in each of said rooms for circulating the fluid.

6. The gas-liquid processing apparatus according to claim 5, wherein said static fluid mixer comprises a passage pipe for the passage of a fluid and a spiral blade body in the passage pipe, an opening being formed in said spiral blade body at the center portion of the passage pipe.

* * * * *